(No Model.)
F. C. JONES.
VULCANIZED RUBBER PACKING.
No. 331,140. Patented Nov. 24, 1885.
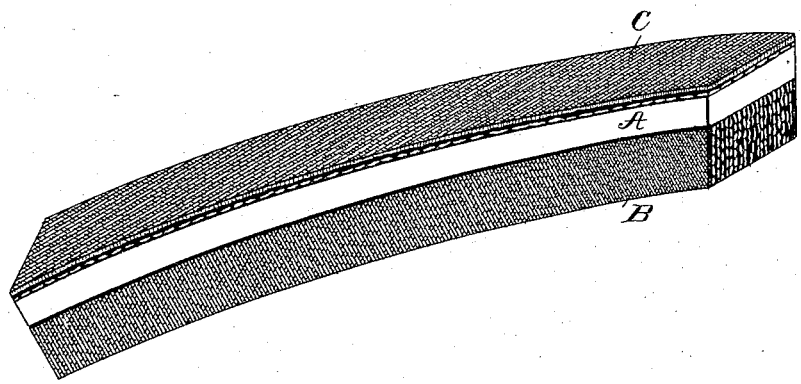

United States Patent Office.

FRANK CAZENOVE JONES, OF NEW YORK, N. Y., ASSIGNOR TO THE NEW YORK BELTING AND PACKING COMPANY, OF SAME PLACE.

VULCANIZED-RUBBER PACKING.

SPECIFICATION forming part of Letters Patent No. 331,140, dated November 24, 1885.

Application filed October 10, 1885. Serial No. 179,467. (No model.)

*To all whom it may concern:*

Be it known that I, FRANK CAZENOVE JONES, of New York, in the county of New York and State of New York, have invented a new and useful Improvement in Vulcanized-Rubber Packing, which improvement is fully set forth in the following specification.

This invention relates more particularly to that class of packing known as "square packing" with elastic rubber back, which is specially designed to pack the piston-rods and valve-stems of steam engines and pumps. Said packing has a band composed of a number of plies of cloth or canvas coated with rubber and pressed together, and a rubber strip applied to the band at the edges of the plies of cloth, the whole being united by vulcanization. A protective strip may be used outside the rubber backing, if desired.

The principal difficulty attending the use of this packing as heretofore made is that under a high temperature, to which piston-packing is or may be exposed, the rubber (which has been the regular black composition used in piston-packing) loses its elasticity and integrity. The consequence is not only that the packing-band is itself injuriously affected, but the backing no longer acts as a spring to hold the packing against the piston-rod with a yielding pressure, and to prevent leakage by compensating for any slight wear in the packing-band.

The present invention has for its object to remedy this difficulty; and to this end it consists in combining with the packing proper a backing composed of a special rubber composition adapted to withstand a higher temperature and endure exposure to high temperatures for a very much longer time than the regular black composition. The packing proper also has or may have its plies united by a similar compound.

The compound best adapted to the purpose is one in which oxide of zinc is the principal ingredient, with fine Para rubber, with talc or soapstone for lubrication, as little sulphur being used as possible, and yet secure the requisite degree of vulcanization. As much cotton-seed oil is also worked into the compound as is possible without destroying its elastic consistency. The cotton-seed oil serves as a lubricant, and, besides, retards burning and hardening. Suitable proportions are ten pounds of fine Para rubber, twenty pounds of oxide of zinc, five pounds of talc, one and one-half pint of cotton-seed oil, and one pound of sulphur. The quantities of oil and sulphur may be varied according to the length of time and the temperature employed in vulcanizing the packing, which is determined by the temperature to which it is to be exposed in use.

Other combinations of rubber with zinc, talc, or soapstone, whiting, barytes, asbestus, &c., (in fact such substances generally as retard vulcanization) might be used, or other oil, such as linseed-oil, could be employed; but the composition given above is deemed the best.

The ingredients are combined in any ordinary or suitable way, the plies of fibrous fabric are coated with the same and pressed together, a strip to form the backing is applied to the band or packing proper, one or more protection-strips are placed on the rubber back, if desired, and the whole is vulcanized at, say, 300° Fahrenheit, for two hours or more, according to the nature of the composition. It is found in practice that it is best to have the thickness of the rubber backing equal to or rather more than half that of the packing proper, or one-third of the entire packing.

The accompanying drawing is a perspective view of a piece of the improved rubber packing made in accordance with the invention.

A is the backing, formed of the composition described or its substantial equivalent, and B the packing proper, formed of a number of plies of cloth or canvas coated with the same or a similar composition and pressed together, and C protective strips outside the backing. The whole is vulcanized, as before stated.

The rubber in the improved packing is white instead of black, as usual; but it will be understood, of course, that the essential feature of the invention resides in the application of rubber having heat-resisting properties due to its constituents, and not in the color which it may have. This white packing will stand a temperature of 50° Fahrenheit higher than the regular black piston-packing.

I claim—

The improved packing having the back composed of an elastic vulcanized heat-resisting compound, such as the compound described, of rubber with oxide of zinc, talc, sulphur, and oil, the said backing being united to the edges of a number of plies of rubber-coated cloth, substantially as set forth.

In testimony whereof I have signed this specification in the presence of two subscribing witnesses.

FRANK CAZENOVE JONES.

Witnesses:
TIMOTHY CORNWELL,
VICTOR E. BURKE.